3,340,243
AQUEOUS SUSPENSION POLYMERIZATION OF VINYL CHLORIDE IN PRESENCE OF A NON-IONIC, WATER SOLUBLE, HYDROPHILIC COLLOID AND AN ACYL PERSULFONATE
Ludwig A. Beer, Agawam, and Frederic J. Locke, East Longmeadow, Mass., assignors to Monsanto Company, a corporation of Delaware
No Drawing. Filed June 10, 1963, Ser. No. 286,473
11 Claims. (Cl. 260—92.8)

This application is a continuation-in-part of copending application S.N. 213,563, filed July 10, 1962, and now abandoned.

This invention relates to the suspension polymerization of vinyl chloride. More particularly, the invention relates to a method of improving the dry blending characteristics and other physical properties of polyvinyl chloride prepared by suspension polymerization.

In many applications vinyl chloride polymers are used in plasticized form. As a result, vinyl chloride polymers are desirable which solvate readily with liquid plasticizers and form dry free-flowing plasticized powders. Such "dry blends" are particularly useful for the production of articles by extrusion and injection molding.

Mere adsorption of the plasticizer on the surface of the polymer particles is undesirable since a large surface area can only be supplied by an extremely small particle which present various handling problems. Consequently, large porous particles are preferred.

Since the porosity of the polymer particles decrease in the course of polymerization with increasing conversion of the monomer, it has been a common practice to stop the polymerization prematurely at for example 75–80% conversion and recover the unpolymerized monomer thereby obtaining the desired porosity. Such a procedure is unreliable, inefficient and time consuming since it is difficult to establish the precise time at which removal of monomer from the reactor should be started. In addition, both the time required for removal and the amount of unpolymerized monomer reduce the production capacity of the reactor appreciably.

Accordingly, it is an object of this invention to provide vinyl chloride polymer compositions having improved physical properties.

Another object of this invention is to provide vinyl chloride polymer compositions having improved dry blending characteristics.

Another object of this invention is to provide granular porous vinyl chloride polymers having a uniform particle size, good heat stability and good electrical properties.

A further object of this invention is to provide a method for producing granular porous vinyl chloride polymers having uniform particle size, good heat stability and good electrical properties with essentially complete conversion of the monomer in an aqueous suspension system.

These and other objects are attained by conducting the suspension polymerization of vinyl chloride in water in the presence of (1) nonionic, water soluble hydrophilic colloids by themselves or in combination with water dispersible esters of polyhydric alcohols and (2) an acyl persulfonate having the structure:

$$R-SO_2-O-O-COR'$$

wherein R is selected from the class consisting of alkyl and cycloalkyl radicals having 5 to 18 carbon atoms and wherein R' is selected from the class consisting of primary, secondary and tertiary alkyl radicals having 1 to 4 carbon atoms.

The following examples are given in illustration of the invention and are not intended as limitations thereof. Where parts are mentioned, they are parts by weight unless otherwise described.

*Example I*

The following is charged to a pressure vessel equipped with an agitator and temperature controlling means:

1480 parts water
1.5 parts methyl-hydroxy propyl cellulose (5.5–7.0% hydroxy propyl, 22–20% methoxyl content)
2.0 parts methyl glucoside dilaurate The resulting mixture is heated to 50° C. and air is purged from the vessel by suitable evacuation means.

After the air is substantially evacuated 1000 parts vinyl chloride monomer is added while maintaining continuous agitation and controlling the reaction temperature within 50±.5° C. A solution of 0.40 part acetyl cyclohexane persulfonate in 1 part tetrachloroethane is then added to the reactor.

As is indicated by a drop in reactor pressure to 30 p.s.i., polymerization is essentially complete after 6 hours polymerization time.

After the unconverted monomer is vented from the reaction vessel, the slurry is filtered. Approximately 920 parts of a granular resin are obtained having a specific viscosity of 0.539 (0.42% in cyclohexanone at 25° C.). The resin passes 100% through a 40-mesh screen and is found to have a particle porosity of 0.290 ml./gram as determined by mercury penetration with an Aminco Winslow Porosimeter (American Instrument Co., Inc.).

*Example II*

The following is charged to a pressure reactor equipped with a reflux condenser, cooling jacket and agitator: 1,000 parts water, 2.4 parts polyvinyl alcohol (Gelvatol 20–60). The air is substantially removed from the reaction vessel and 1,000 parts of vinyl chloride are then added. The temperature is then adjusted to 50° C. and 1.4 parts of acetyl cyclohexane persulfonate dissolved in 2 parts of carbon tetrachloride are added. At this peroxide concentration, polymerization is essentially complete within 90 minutes. After venting and filtration, a granular resin is obtained having a specific viscosity of 0.520 and a particle porosity of 0.13 ml./gram.

*Example III*

The following materials are charged to a pressure reactor:

| | Parts |
|---|---|
| Water | 1,500 |
| Polyvinyl alcohol (82% hydrolyzed) | 1.5 |
| Sorbitan monolaurate | 2.0 |
| Vinyl chloride monomer | 1,000 |
| Acetyl methylcyclohexane persulfonate | 0.7 |

The temperature is maintained at 45° C. for 5 hours. At the end of this time, polymerization is essentially complete. The slurry is then filtered, washed with water and dried at 50° C. Approximately 943 parts of granular resin are obtained having a specific viscosity of 0.641 and a particle porosity of 0.380 ml./gram.

*Example IV*

The polymerization of the vinyl chloride monomer is carried out as in Example I except that 0.04% of acetyl hexane persulfonate is used in place of the acetyl cyclohexane persulfonate. Polymerization is essentially complete after 4½ hours. After filtration, washing and drying, a granular resin is obtained having a specific viscosity of 0.531 and a particle porosity of 0.282 ml./gram.

Example V

The polymerization of the vinyl chloride monomer is carried out as in Example I except that 0.04% acetyl heptane persulfonate is used in place of the acetyl cyclohexane persulfonate. The polymerization is interrupted after 2, 3 and 4 hours by the addition of a polymerization inhibitor. The percent of monomer conversion after these respective time periods, are found to be as follows:

| Polymerization Time (Hours) | Percent Conversion | Average Rate, Percent Per Hour |
|---|---|---|
| 2 | 32.8 | 16.4 |
| 3 | 50.5 | 16.8 |
| 4 | 66.1 | 16.5 |
| 5 | 83.0 | 16.6 |
| 6 | 92.0 | 15.3 |

As indicated by the conversion data, a rather uniform polymerization rate is achieved at 50° C. with these initiators and suspending agents as distinguished from conventional initiators and other types of suspending agents, i.e., ionic. The use of conventional initiators such as lauroyl-, benzoyl-, 2,5 - dichlorobenzoyl - peroxide or azodiisobutyronitrile give a sinusoidal rate curve, i.e., acceleration of the polymerization up to 80% conversion. This non-uniform polymerization rate requires highly sensitive temperature control for maintenance of a constant polymerization temperature.

Example VI

The polymerization of the vinyl chloride monomer is carried out as in Example III at 45° C. except that 0.033% acetyl cyclohexane persulfonate is used in place of the acetyl methyl cyclohexane persulfonate. The polymerization is essentially complete after 16 hours.

In order to achieve the same polymerization rate at these temperatures, 0.78% or over 20 times the amount of lauroyl peroxide is required.

Example VII

A pressure reactor is charged as follows:

| | Parts |
|---|---|
| Water | 1,500 |
| Methyl hydroxypropyl cellulose | 1.5 |
| Sorbitan monolaurate | 2.0 |
| Acetyl cyclohexane persulfonate (solid) | 3.3 |

The temperature is maintained below 30° C. and the reactor substantially purged of oxygen by repeated evacuation and pressurizing with vinyl chloride vapor after which 1,000 parts of liquid vinyl chloride monomer is charged. The temperature is maintained at 30° C. for 7 hours, after which time the conversion is essentially complete. Approximately 915 parts of granular resin are obtained having a specific viscosity of 1.008 and a particle porosity of 0.625 ml./gram are obtained.

Example VIII

The procedure of Example VII is followed except that 6.7 parts of acetyl methyl cyclohexane persulfonate are used in place of the acetyl cyclohexane persulfonate and the polymerization is carried out at 20° C. instead of 30° C. A monomer conversion of 90% is achieved after 8 hours polymerization time. The granular resin that is obtained has a specific viscosity of 1.595 and a particle porosity of 0.652 ml./gram.

Example IX

The procedure of Example VII is followed except that 1.7 parts of acetyl cyclohexane persulfonate is used instead of 3.3 parts of that example and the polymerization is carried out at 25° C. instead of 30° C. Polymerization is essentially complete after 24 hours producing a resin having a specific viscosity of 1.375.

Example X

A pressure reactor is charged as follows:

| | Parts |
|---|---|
| Water | 1,600 |
| Methyl hydroxypropyl cellulose | 1.5 |
| Sorbitan monolaurate | 2.0 |
| Lauroyl peroxide | 2.4 |

The reactor is purged of oxygen by repeated evacuation and pressurizing with vinyl chloride vapor after which 1,000 parts of liquid vinyl chloride monomer are added. Polymerization is carried out at 50° C. for 16 hours, after which polymerization is essentially complete. This is considerably longer than the time required in Example I for complete polymerization even though a much higher concentration of polymerization initiator was used. Approximately, 920 parts of a granular resin having a specific viscosity of 0.530 and a particle porosity of 0.252 ml./gram are obtained. One hundred parts of each of the resins obtained, according to Examples VII, VIII, IX and X are sheeted on roll mills at 185–195° C. after addition of 2 parts dibutyl tin maleate. Test samples are molded in a press at 205° C. for determination of physical properties.

| Property | VII | VIII | IX | X |
|---|---|---|---|---|
| | Polymerization Temperature, ° C. | | | |
| | 30 | 20 | 25 | 50 |
| Tensile strength, p.s.i.: | | | | |
| At yield | 7,850 | 7,800 | 7,800 | 7,730 |
| At failure | 7,300 | 7,620 | 7,670 | 7,170 |
| Elongation, percent: | | | | |
| At yield | 4.6 | 4.9 | 4.8 | 4.4 |
| At failure | 120 | 124 | 144 | 129 |
| Modulus, p.s.i.×10⁵ | 3.4 | 3.4 | 3.4 | 3.4 |
| Heat distortion ° C at 264 p.s.i. | 76.4 | 75.0 | 75.5 | 70.3 |

Example XI

The procedure of Example I is followed except that 0.50 part of acetyl decalin persulfonate is used in place of the 0.40 part of acetyl cyclohexane persulfonate. As in Example I, a granular resin is obtained having a specific viscosity of about 0.539 and a porosity of about 0.290 ml./gram.

Example XII

The procedure of Example I is followed except that 0.75 part of acetyl octadecane persulfonate are used in place of the 0.40 part of acetyl cyclohexane persulfonate. As in Example I, a granular resin is obtained having a specific viscosity of about 0.539 and a porosity of about 0.290 ml./gram.

As earlier noted, the objects of this invention are attained by conducting the polymerization of vinyl chloride in water in the presence of (1) nonionic, water-soluble hydrophilic colloids by themselves or in combination with water dispersible esters of polyhydric alcohols and (2) an acyl persulfonate having the structure:

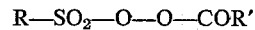

R—SO₂—O—O—COR' wherein R is selected from the class consisting of alkyl and cycloalkyl radicals having 5 to 18 carbon atoms and wherein R' is selected from the class consisting of primary, secondary and tertiary alkyl radicals having 1 to 4 carbon atoms. With respect to R', the primary or methyl radical is preferred. Typical examples of R radicals are cyclohexyl, methylcyclohexyl, n-heptyl, n-hexyl and the like.

With the exception of the novel feature of conducting the polymerization in the presence of (1) nonionic water-soluble hydrophilic colloids and (2) an acyl persulfonate having the structure:

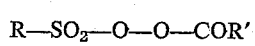

R—SO₂—O—O—COR' wherein R is selected from the class consisting of alkyl and cycloalkyl radicals and wherein R' is selected from the class consisting of primary, secondary and tertiary alkyl radicals, the process of the invention is a conventional suspension polymerization process. Thus, vinyl chloride is polymerized with agitation and in an oxygen-free atmosphere in the presence of the above suspending agents and catalysts at temperatures usually in the range of 20–70° C., preferably 40–60° C., under pressure. The amount of water employed is such that the water/monomer ratio is in the range of 1:1 to 9:1, usually about 1:1 to 2:1.

The use of the featured suspending agents and catalysts of this invention produce granular resin of uniform particle size having a porosity in the range of 0.05 to 1.0 ml./gram. The use of acetyl cyclohexane persulfonate and the other acyl persulfonates disclosed above also contributes high polymerization speeds in relation to other conventional catalysts with a lesser quantity of catalyst required. Faster polymerization cycles are obtained while simultaneously producing a polymer which is decidedly superior in resistance to discoloration by heat. This highly desirable performance is due to the reduced amount of catalyst residue remaining in the product when compared to conventional polymerization initiators. The quantity of catalyst can be advantageously varied between 0.01 to 0.3% by weight of the monomer depending on the temperature and the rate of polymerization desired. Optimum catalyst performance producing a resin of outstanding thermal stability can be obtained in the preferred range of 0.015 to 0.045%.

In addition to contributing to the control of particle size and porosity, the use of the nonionic, water-soluble, hydrophilic colloids either by themselves or in combination with water dispersible esters of polyhydric alcohols serve to produce resins having good heat stability and good electrical properties.

As nonionic, water-soluble, hydrophilic colloids we refer to substances which do not ionize when dissolved in water and therefore are not acids, bases, or salts. The preferred colloids contain a multiplicity of hydroxyl and/or ether groups such as derivatives of polysaccharides or synthetic polymers such as polyvinyl alcohol which are soluble in water at temperatures below 65° C., and contain sufficient organophilic groups to promote adsorption at the interface between vinyl chloride droplets and water. Examples of this type of material are cellulose ethers such as methyl hydroxy propyl cellulose or incompletely hydrolyzed polyvinyl esters, i.e., polyvinyl alcohol having a degree of hydrolysis between 60–99% and more preferably between 70–88% or an equivalent amount of other polyvinyl esters of monocarboxylic organic acids. Suitable esters of polyhydric alcohols are, for example, saturated or unsaturated fatty acid esters of ethylene or propylene glycol or of their polymers, or of sorbitol, mannitol or their inner ethers, glycerol, pentaerithritol, etc., which have less than a majority of the hydroxyl groups of the polyhydric alcohol esterified or acylated.

*Example XIII*

The procedure of Example I for the polymerization of the vinyl chloride monomer is carried out for each of the suspending agents listed in Table I in place of the methyl hydroxypropyl cellulose and methyl glucoside dilaurate. The percentage of suspending agent used in each case is based on the monomer weight and is indicated in Table I. The monomer conversion was in all cases in excess of 90%. The experimental runs of Table I illustrate the effect of the different suspending agents on the particle porosity of the granular resins. By porosity is meant the average pore volume in milliliters per gram of the individual particles at a pore diameter between .05–5 microns. The mean pore diameter is calculated from the pore volume of pores between .05–5 microns as measured by mercury penetration with a Aminco Winslow porosimeter.

TABLE I

| Experiment No. | Suspending Agent | Percent Suspending Agent Based on Monomer Wt. | Particle Porosity [1] | |
|---|---|---|---|---|
| | | | Pore Volume, ml./g. | Mean pore diameter, microns |
| 1 | Polyvinyl alcohol 98% hydrolyzed, (see note 1) | .24 | .087 | .25 |
| 2 | Polyvinyl alcohol 82% hydrolyzed, (see note 2) | .24 | .173 | .22 |
| 3 | Polyvinyl alcohol 82% hydrolyzed, (see note 2) / Glycerol monostearate | .15 / .20 | .210 | .30 |
| 4 | Methyl hydroxy propyl cellulose (see note 3) / Glycerol monostearate | .15 / .20 | .375 | .70 |
| 5 | Polyvinyl alcohol 82% hydrolyzed (see note 2) / Sorbitan monolaurate | .15 / .20 | .387 | .86 |
| 6 [2] | Methyl-hydroxy propyl cellulose / Glycerol monostearate | .20 / .20 | .213 | .40 |
| 7 [2] | Methyl hydroxy propyl cellulose / Methyl glucoside dilaurate | .20 / .20 | .220 | 1.0 |
| 8 [2] | Methyl hydroxy propyl cellulose | .20 | .167 | .44 |
| 9 | Polyvinyl alcohol 82% hydrolyzed, (see note 2) / Sorbitan monolaurate | .15 / .20 | .434 | .90 |
| 10 | Polyvinyl alcohol 88% hydrolyzed, (see note 4) / Sorbitan monolaurate | .15 / .20 | .390 | .82 |
| 11 | Methyl hydroxy propyl cellulose / Methyl glucoside dilaurate | .15 / .20 | .370 | .68 |
| 12 | Methyl hydroxy propyl cellulose / Sorbitan monolaurate | .15 / .20 | .370 | .90 |
| 13 | Polyvinyl alcohol 88% hydrolyzed (see note 4) | .24 | | |
| | (a) 13.8% conversion | | .825 | 1.10 |
| | (b) 24.1% conversion | | .812 | .90 |
| | (c) 56.8% conversion | | .350 | .27 |
| | (d) 94.8% conversion | | .175 | .27 |

[1] Pore diameter 0.05–5 microns.
[2] Water:monomer ratio 200:100 on weight basis.
NOTE:
 1—Polyvinyl alcohol, 4% aqueous solution at 20° C. 52 centipoises.
 2—Polyvinyl alcohol, 4% aqueous solution at 20° C. 40 centipoises.
 3—5.5–7.0 hydroxyl propyl, 22–23% methoxyl, 2% aqueous solution at 20° C. 100 cps.
 4—Polyvinyl alcohol, 40% aqueous solution at 20° C., 22 cps.

100% of all of the above resins pass through a 60-mesh ASTM screen (250 microns opening). The results as shown in Table I demonstrate the marked difference in particle porosity with variations in the type of suspending agent. In experiment No. 1 a polyvinyl alcohol is used as suspending agent which contains essentially no organophilic groups (98% hydrolyzed). The resin particles are in this case almost impervious and absorb plasticizer only after prolonged mixing and at increased temperature. Consequently, when polyvinyl alcohol is used as a suspending agent the degree of hydrolysis should be below 88% and more preferably in the range of 70–88%. The quantity of polyvinyl alcohol may be varied within wide limits; for example, between 0.03 to 1.0 part by weight of monomer and more preferably 0.05–0.5%. As indicated in the above Table I methylhydroxy propyl cellulose will produce resins having good porosities. This suspending agent can also be used within wide limits such as 0.03–1.0% by weight of monomer and more preferably 0.05–0.5%. The preferred methylhydroxy propyl cellulose is one having a methoxyl content of 19–30% and a hydroxy propyl content of 4–12% which will form a 2% aqueous solution having a viscosity of about 20–2,000 centipoises at 20 C. Good results can also be obtained in a dispersion which contains in addition to the hydrophilic colloid, 0.02–1.0 and more preferably 0.05–0.5% by weight of monomer of a polyhydric alcohol which has less than a majority of its hydroxyl groups acylated.

Another factor influencing particle porosity besides monomer conversion and type of suspending agent is polymerization temperature. As the experiments in Example XIV indicate the particle porosity decreases with increasing polymerization temperature at comparable conditions in respect to monomer conversion and suspending sytem.

*Example XIV*

The procedure of Example I for the polymerization of the vinyl chloride monomer is carried out for each of the suspending agents listed in Table II except that the percentage of suspending agent used as indicated in Table II is based on monomer weight and the polymerization temperature is as indicated in said table.

If desired, the polymerization can be conducted in the presence of additives such as preformed polymers, e.g., natural and synthetic rubbers, fillers, colorants, etc.

It is obvious that many variations can be made in the products and processes set forth above without departing from the spirit and scope of the invention.

What is claimed is:

1. The process for the homopolymerization of vinyl chloride which comprises conducting the polymerization of vinyl chloride monomer in aqueous suspension in the presence of (1) nonionic, water soluble, hydrophilic colloids and (2) an acyl persulfonate having the structure:

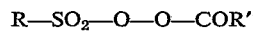

wherein R is selected from the class consisting of alkyl and cycloalkyl radicals and wherein R' is selected from the class consisting of primary, secondary and tertiary alkyl radicals.

2. The process as in claim 1 wherein the nonionic, water-soluble hydrophilic colloid is polyvinyl alcohol.

3. The process as in claim 1 wherein the nonionic, water-soluble hydrophilic colloid is methyl hydroxy propyl cellulose having a methoxyl content of 19–30 percent by weight and a hydroxy propyl content of 4–12 percent by weight.

4. The process as in claim 1 wherein the acyl persulfonate is acetyl cyclohexane persulfonate.

5. The process as in claim 1 wherein the acyl persulfonate is acetyl methyl cyclohexane persulfonate.

6. The process as in claim 1 wherein the acyl persulfonate is acetyl heptane persulfonate.

7. The process as in claim 1 wherein the acyl persulfonate is acetyl hexane persulfonate.

8. The process for the homopolymerization of vinyl chloride which comprises conducting the polymerization

TABLE II

| Experiment No. | Suspending Agent | Percent Suspending Agent Based on Monomer Wt. | Polymerization Temp., °C. | Particle Porosity [1] | |
|---|---|---|---|---|---|
| | | | | Pore Volume, ml./g. | Mean pore dia., μ |
| 14 | Polyvinyl alcohol 82% hydrolyzed | (a) 0.24 | 60 | 0.060 | |
| | | (b) 0.24 | 50 | 0.193 | 0.22 |
| | | (c) 0.24 | 40 | 0.333 | 0.50 |
| 15 | Methyl hydroxy propyl cellulose, Glycerol monostearate (0.20%). | (a) 0.15 | 50 | 0.375 | 0.74 |
| | | (b) 0.20 | 45 | 0.520 | 0.81 |
| 16 | Methylhydroxy propyl cellulose, Sorbitan monolaurate (0.20%). | (a) 0.15 | 50 | 0.370 | 0.90 |
| | | (b) 0.15 | 45 | 0.527 | 1.2 |

[1] Pore diameter 0.05–5 microns.

As the polymerization temperature approaches the heat distortion temperature of the polymer which is slightly swollen by monomer, the incidence of impervious, glassy particles becomes greater. It is now possible with the more highly active acetyl-cyclohexane persulfonate and/or its analogs as initiator to polymerize at lower temperatures without loss of reactor capacity and achieve advantages in respect to particle porosity and therefore dry blendability of the resin. To obtain a polymer of lower molecular weight and offset the increasing effect of a lower polymerization temperature on molecular weight, a chain transfer agent such as a halogenated aliphatic hydrocarbon may be used if so desired.

Although the invention has been described with particular emphasis on the homopolymerization of vinyl chloride, it is also applicable to the copolymerization of vinyl chloride with up to an equal amount by weight of one or more copolymerizable monomers, e.g., diethyl maleate, other dialkyl maleates, dialkyl fumarates, ethylene, vinyl acetate, vinylidene chloride, acrylonitrile, methyl acrylate, other alkyl acrylates, etc.

of vinyl chloride monomer in aqueous suspension in the presence of (1) a dispersion which contains a nonionic, water-soluble, hydrophilic colloid and an ester of a polyhydric alcohol and (2) an acyl persulfonate having the structure:

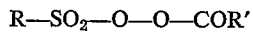

wherein R is selected from the class consisting of alkyl and cycloalkyl radicals and wherein R' is selected from the class consisting of primary, secondary and tertiary alkyl radicals.

9. The process as in claim 8 wherein the polyhydric alcohol of said dispersion has less than a majority of its hydroxyl groups esterified.

10. The process for the homopolymerization of vinyl chloride which comprises conducting the aqueous suspension polymerization of vinyl chloride monomer in a closed air-evacuated system, wherein the water:monomer weight relationship is about 1:1 to 2:1, at a temperature between 40 to 60° C. in the presence of (1) nonionic, water-soluble hydrophilic colloids and (2) an acyl persulfonate having the structure:

$$R-SO_2-O-O-COR'$$

wherein R is selected from the class consisting of alkyl and cycloalkyl radicals and wherein R' is selected from the class consisting of primary, secondary and tertiary radicals.

11. The process as in claim 10 wherein the acyl persulfonate comprises 0.015 to 0.045 percent by weight of said monomer.

References Cited

UNITED STATES PATENTS

| | | | |
|---|---|---|---|
| 2,975,162 | 3/1961 | Iloff | 260—85.7 |
| 3,228,919 | 1/1966 | Gatta | 260—92.8 |

OTHER REFERENCES

Schildknecht: Polymer Processes, Interscience Publishers Inc., New York (1956), pp. 77–81.

JOSEPH L. SCHOFER, *Primary Examiner.*

M. B. KURTZMAN, *Assistant Examiner.*